(12) United States Patent
El Hafidi et al.

(10) Patent No.: US 7,202,984 B2
(45) Date of Patent: Apr. 10, 2007

(54) DOUBLE FACED DOUBLE STORAGE CAPACITY MEDIUM

(75) Inventors: Idriss El Hafidi, Strasbourg (FR);
Romualda Grzymala, Strasbourg (FR);
Patrick Meyrueis, Strasbourg (FR)

(73) Assignee: Research Investment Network, Inc., Long Beach, CA (US)

( * ) Notice: Subject to any disclaimer, the term of this patent is extended or adjusted under 35 U.S.C. 154(b) by 32 days.

(21) Appl. No.: 10/511,624

(22) PCT Filed: Apr. 26, 2002

(86) PCT No.: PCT/EP02/05446

§ 371 (c)(1),
(2), (4) Date: Oct. 18, 2004

(87) PCT Pub. No.: WO03/091996

PCT Pub. Date: Jun. 11, 2003

(65) Prior Publication Data

US 2005/0170260 A1    Aug. 4, 2005

(51) Int. Cl.
*G03H 1/26* (2006.01)

(52) U.S. Cl. .............................. 359/22; 359/6; 359/24

(58) Field of Classification Search ................ 359/22, 359/24, 6
See application file for complete search history.

(56) References Cited

U.S. PATENT DOCUMENTS 5,007,690 A    4/1991    Chern et al.
5,946,286 A *  8/1999    Bahns ..................... 369/275.3
2003/0063342 A1* 4/2003  Horimai .................... 359/22

FOREIGN PATENT DOCUMENTS

EP    1 065 658 A1    1/2001
WO    0030084 A1      5/2000

OTHER PUBLICATIONS

Hsin-Yu Sidney et al.: "Three-Dimensional Holographic Disks", Applied Optics, Optical Society of America, Washington, US, vol. 33, No. 17, Jun. 10, 1994, pp. 3764-3774, XP000454720, ISSN: 0003-6935, p. 1-p. 3.
Homan S, et al.: "High-Capacity Optical Storage Using Multiple Wavelengths, Multiple Layers And Volume Holograms"; Electronics Letters, IEE Stevenage, GB, vol. 31, No. 8, Apr. 13, 1995, pp. 621-623, XP 006002721—ISSN: 0013-5194.
Ho H Ph: "Application of Dual Probe Direct Interference To Multilayered High Density Optical Storage: A Proposal"; Electronics Letters, IEE Stevenage, GB, vol. 33, No. 7, Mar. 27, 1997, pp. 621-622, XP 006007264—ISSN: 0013-5194.

* cited by examiner

Primary Examiner—Fayez G. Assaf
(74) Attorney, Agent, or Firm—Steve A. Wong; Caroline T. Do

(57) ABSTRACT

A first holographic data storage device has a first set of holograms stored thereon. A second holographic data storage device has a second set of holograms stored thereon. An opaque layer is disposed between and attached to one side of the first and the second holographic data storage devices. In the case of double reflective diffractive recording, the opaque layer is not necessary.

12 Claims, 4 Drawing Sheets

TRANSMISSIVE HOLOGRAPH MEMORY

RECORDING

READING

REFLECTIVE HOLOGRAPH MEMORY

RECORDING

READING

ANGULAR SELECTIVITY $$\Delta\theta = \frac{\lambda}{2d\,\text{SIN}(\theta_B)}$$

DOUBLE FACED DOUBLE STORAGE CAPACITY MEDIUM

FIELD OF THE INVENTION

The present invention generally relates to photonics data memory devices. In particular, the present invention relates to a double-faced diffractive holographic data storage device.

BACKGROUND OF THE INVENTION

There is a strong interest in high-capacity data storage systems with fast data access due to an ever-increasing demand for data storage. Limitations in the storage density of conventional magnetic memory devices have led to considerable research in the field of optical memories. Holographic memories have been proposed to supersede the optical disc (CD-ROMs and DVDs) as a high-capacity digital storage medium. The high density and speed of holographic memory results from the use of three-dimensional recording and from the ability to simultaneously read out an entire page of data. The principal advantages of holographic memory are a higher information density, a short random-access time, and a high information transmission rate.

While holographic data storage systems have not yet replaced current CD and DVD systems, many advances continue to be made which further increase the potential of storage capacity of holographic memories. This includes the use of various multiplexing techniques such as angle, wavelength, phase-code, fractal, peristrophic, and shift. However, previous methods for recording information in highly multiplexed volume holographic elements, and for reading them out, have not proved satisfactory in terms of throughput, crosstalk, and storage capacity.

It has also been proposed to use double-sided holographic data storage device. However, issues such as crosstalk between layers, speed of data access and speed of access to the double diffractive holographic layers continue to challenge technological advances in this area.

Thus, it would be desirable to provide a diffractive holographic data storage device, which increases storage capacity by utilizing double layers of the data storage device. Also, it would be desirable to provide techniques for providing fast access to double sides and layers of a diffractive holographic data storage device. Furthermore, it will be desirable to provide a diffractive holographic data storage device, that is compatible with the traditional HYDIF multiplexing technology. The compatibility is coming from the smart association of two diffractive sides recorded with HYDIF process but allowing by an improvement a simultaneous simple reading of both faces. This association doubles the storage capacity and increase global reading speed of stored data access.

SUMMARY OF THE INVENTION

According to one aspect of the invention, a double-sided diffractive holographic data storage device includes a first diffractive holographic data storage device having a first set of holograms stored thereon and a second diffractive holographic data storage device having a second set of holograms stored thereon. The first reflective hologram is formed by the diffracted part of the reference beam processed by the first side of the double-side diffractive holographic data storage device. The storage device may be coated with polypeptide material. As an example, an opaque layer is disposed between and attached to one side of the first and second diffractive holographic data storage devices. In accordance with another aspect of the invention, an apparatus and method for reading a double-sided diffractive holographic data storage device having first and second reflective holograms stored on first and second sides respectively is provided. The apparatus includes a light source for generating a reference beam, a multi-scanning device for directing the reference beam incident on the first side of the double-sided diffractive holographic data storage device at a predetermined angle, wherein a first reflective hologram is formed by the reference beam reflected from the first side of the double-sided diffractive holographic data storage device. A detecting device is provided for detecting the reference beam reflected from the double-sided diffractive holographic data storage device. A rotating unit rotates the double-sided diffractive holographic data storage device into one of two positions, wherein when the rotating unit is in a first position, the reference beam is incident upon the first side of the double-sided diffractive holographic data storage device and the detecting device detects the first output data packet (i.e., diffractive holographic image) reflected from the first side of the diffractive holographic data storage device, and when the rotating unit is in a second position, the reference beam is incident upon a second side of a double-sided diffractive holographic data storage device, and its detecting device detects the second output data packet (i.e., diffractive holographic image) reflected from the second side of the diffractive holographic data storage device.

According to another aspect of the invention, an apparatus and method of reading a double-sided diffractive holographic data storage device having a reflective and a transmissive set of diffractive patterns storing data packets on first and second sides is provided.

Further objects, advantages, and novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a schematic representation of an apparatus for recording data in the form of a reflective hologram in accordance with one embodiment of the present invention.

DETAILED DESCRIPTION OF THE INVENTION

Storing/Recording Phase

A diffractive holographic data storage device contains information stored during a phase of storing information. In the storing or recording phase, a laser emits a coherent light beam that is split into two beams, a reference beam and an object beam, by means of a splitter (as shown in FIG. 2). The object beam may be filtered and collimated. The object beam is directed to a display means, which displays an image to be recorded. The object beam becomes modulated by the information to be recorded by means of reflection off the display or transmission through the display.

The display may be any device for displaying a data packet in a system, such as a spatial light modulator (SLM) or liquid crystal light valve (LCLV). The plurality of bits represented on the display screen of the display may be presented as a two-dimensional pattern of transparent and opaque pixels (i.e., data packet). The data packet displayed is derived from any source such as a computer program, the Internet, and so forth. In an Internet storage application, the packets displayed may be formatted similarly to the packets of the Internet.

The reference laser beam defines the address where the information is to be stored. The reference laser beam interferes coherently with the object beam, which is the laser beam carrying the information to be stored, to form the interference pattern or hologram, which is stored in the memory device due to the perturbation in the refractive index. Thus, each hologram is stored at a unique angle of the reference beam. The separation between the various holograms stored within the same volume relies on the coherent nature of the hologram, in order to allow its retrieval in phase with the volume only for a defined angle value. It is noted that the reference beam may undergo various reflections and orientations using a set of mirrors to modify the angle between the reference beam and the object beam. Thus, by this mechanism angular multiplexing is implemented. In other words, angular multiplexing is carried out by sequentially changing the angle of the reference beam by means of mirrors. The multiplexing process may be programmable. It is also contemplated that the reference beam provides an identity for the page carried by the signal beam or object beam, so that the information is distinguishable from other pages sharing the same volume inside the diffractive holographic data storage medium.

Figure 1A:
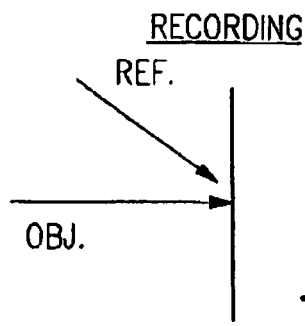
FIGS. 1A–1D are graphs illustrating recording and reading processes of transmissive and reflective holography in accordance with one embodiment of the present invention.
Figure 1B:
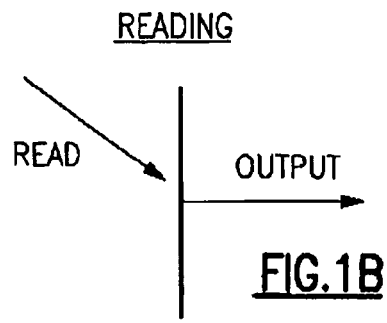
Figure 1C:
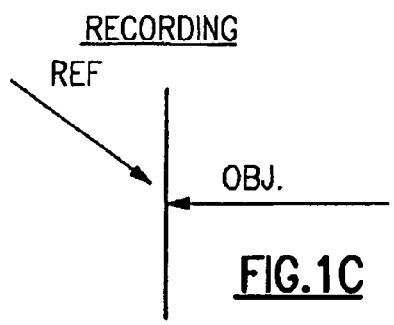

Whether a reflective holograph memory or a transmissive holograph memory is produced depends on the recording process. A transmissive hologram is produced when, in the recording process, the reference beam and object beam are on the same side of the diffractive holographic plate (FIG. 1A). A reflective hologram is produced when, in the recording process, the reference beam and object beam are on the opposite side of the diffractive holographic plate (FIG. 1C). Details of a reading process of the different types of holograms are described below.

Reading Phase

Retrieving the stored information from the diffractive holographic data storage device requires the use of a read beam whose characteristics correspond to those employed for writing or for storage (wavelength, angle of incidence and position within the storage material). This read beam induces diffraction due to perturbation in the refractive index corresponding to the characteristics of the beam, thereby creating the stored modulated beam. The read beam carries the address of the page selected for retrieval. Physically, addressing during retrieval is similar to the recording phase (i.e., the read beam replicates the reference beam used for storing the desired pages).

The read beam may be controlled by an addressing-read system that includes mirrors or micromirrors associated with actuators, i.e., galvanometers or micromotors, therefore capable of undergoing rotation that allows each mirror to be oriented in the desired direction. These mirrors may be positioned at defined points or nodes by software, for the purpose of angularly indexing a wavefront for a point of defined coordinates (X,Y) in the memory device. The laser beam angular processing can be also implemented through dynamic means of grating or acoustic optics or a joint use of both or other microtechnologies.

In angular multiplexing, the read beam is positioned in order to access a data packet contained at a defined point (X,Y) in a diffractive holographic data storage device corresponding to an addressing angle. The reference beam angles in the reading procedure are similar to the reading (e.g., reference) beam angles the writing or recording procedure. However, the reading procedure may be carried out with a greater degree of tolerance than the recording procedure. It is possible to use a very compact laser source of a solid-state type for the reading process because laser power necessary for reading is much lower than the one for recording. It is contemplated that the wavelength of the read beam may be the same at the wavelength of the recording beam (e.g., reference beam).

Figure 1D:
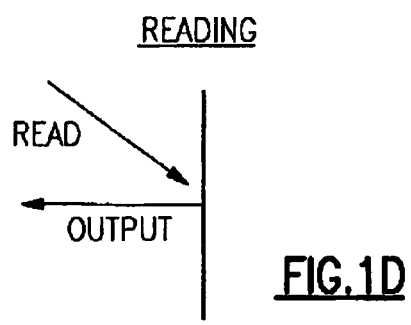

Referring to FIG. 1A, there is shown a schematic representation of a transmissive hologram in accordance with conventional holographic recording techniques. In the recording set up, the object beam and the reference beam reach the recording plate on the same side. Referring to FIG. 1C, there is shown a schematic representation of a reflective hologram in accordance with non-conventional holographic recording techniques. In this recording setup, the object beam and the reference beam reach the recording plate on the opposite side. FIG. 1B is referring to a schematic representation of a transmissive hologram in accordance with diffractive holographic reading techniques. To read a page or a packet of information, the reading and output beams are located on the opposite side of the transmissive hologram, while FIG. 1D is referring to a schematic representation of a reflective hologram in accordance with diffractive holographic reading techniques. In this case, the reading and output beams are located on the same side of the reflective hologram.

Referring to FIG. 2, there is shown a schematic representation of an apparatus 200 for recording data in the form of a reflective hologram according to one embodiment of the invention. The recording apparatus 200 includes a laser 220, a beam splitter 270, a tilting micromirror 240, a multimirror device 260, a data recording plate 280, a first lens 230, a second lens 210, a display device (e.g., spatial light modulator (SLM)) 250, mirrors 215, 225, and a computer 290.

In the recording apparatus 200 shown in FIG. 2, a light beam 201 from the laser 220 is directed to the splitter 270 which splits the light beam 201 into an object beam 202 and a reference beam 203. The reference beam 203 is then emitted to the tilting micromirror unit 240, which directs the beam to a preselected mirror in the multimirror device 260. The light is reflected from the multimirror device 260 to a data recording plate 280 which comprises a polypeptide material or other materials with similar characteristics. Further details of the angular multiplexing technique used in the recording apparatus of 200 as well as the polypeptide material in the recording plate 280 are described in a copending application entitled "Photonics Data Storage System Using a Polypeptide Material and Method for Making Same", Serial No. PCT/FR01/02386, which is hereby incorporated by reference in its entirety.

The polypeptide layer may be calibrated to resolve in a thickness range of approximately 10 to 40 micros depending on the application. It should be noted that some crosstalk between the layers may limit the density of each layer so as to reduce the density of the optical density. Nevertheless, the two sides result in a doubling of the global density which more than makes up for this loss. To optimize the crosstalk, each layer may be constructed using a different composition. For example, each layer may have different doping. It is noted that the underneath layer receives less light energy than the above one layers and because every layer absorbs one part of the energy, the underneath layer has the response. Therefore, the doping may be adapted to compensate for different layers. The process is to be adapted for every layer and that through the process, the top layer is more hardened because it supports the protective coat. Thus, a controlling process of the thickness of every layer may be developed to achieve optimization of the crosstalk.

The computer 290 generates data recorded with two consecutive angles, which is to be stored on the data recording plate 280. This data is transferred to an optical representation on the SLM 250. The object beam light 202 reflects off mirrors 215 and 225 and passes through the SLM 250. After passing through the SLM 250, the light is modulated and reaches lenses 230 and 210 which collimate the light and direct it to the back of the data recording plate 280, forming a reflective diffractive holographic image by interference between the reference beam 203 reflected from the multimirror device 260.

Figure 3:
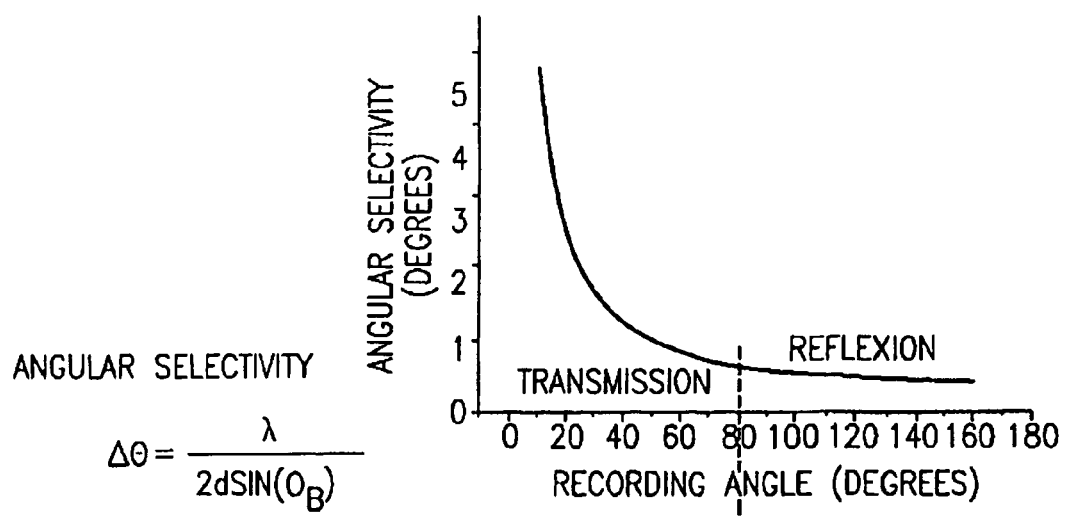
FIG. 3 is a graph showing the effect of recording angle on angular selectivity in accordance with one embodiment of the present invention.

Referring to FIG. 3, a graph is provided showing the effect of recording angle on angular selectivity according to one embodiment of the invention. Angular selectivity is defined as the angle of separation, which is required to prevent crosstalk between two adjacent packets of data in an angularly multiplexed hologram. The graph shows that for the same thickness of a polypeptide layer the angular selectivity is between 1° and 6° for a transmissive hologram and less 1° for a reflective hologram.

The angle selectivity $\Delta\Theta$ may be different in the reflective case and in the transmissive case, the reason being that the physics of the layer internal molecular organization induced by light modulation in the two cases is not the same. The angular selectivity is defined as:

$$\Delta\Theta = \lambda/2d \sin(\Theta_B)$$

Where $\Delta\Theta$ is the angular difference between two angular multiplexing angles;

d is the thickness of the polypeptide layer; and $\Theta_B$ is the Bragg angle.

In is contemplated that this angle, for a given modulation, gives maximum diffraction efficiency. In one embodiment, this angle can be the recording angle in the case where there is no modification of the thickness of the polypeptide layer between recording and reading.

Figure 4:
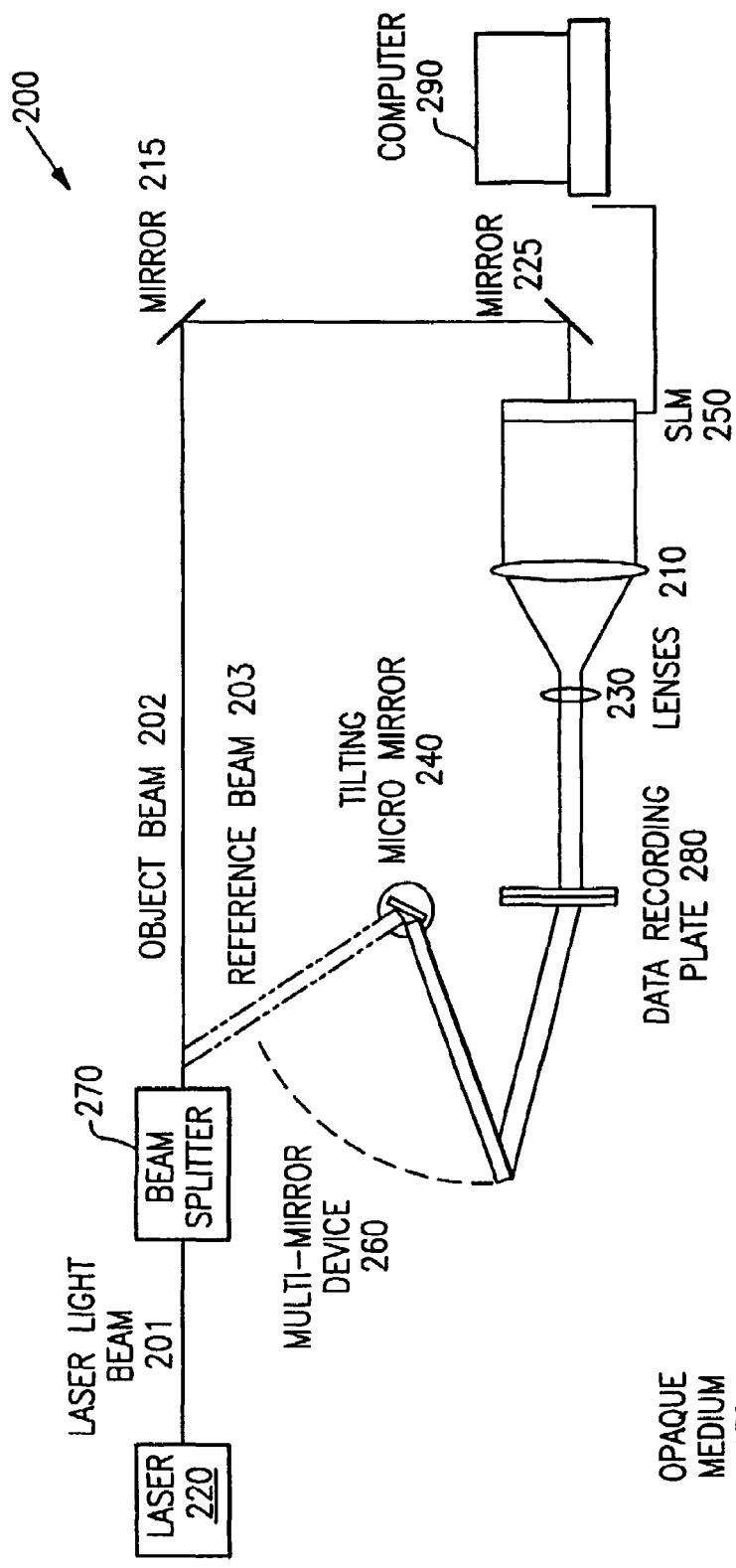
FIG. 4 is a schematic representation of a double-faced diffractive holographic data storage device in accordance with one embodiment of the invention.

FIG. 4 is a schematic representation of a double-faced diffractive holographic data storage device in accordance with one embodiment of the invention. The double-faced diffractive holographic data storage device 400 includes a first face 410, a second face 420 and an opaque medium 430.

Each of the 410 and 420 faces is recorded using the recording apparatus as shown in FIG. 1. Each separate diffractive holographic data storage device is then attached to opposite sides of an opaque medium 430. In one embodiment, these separate diffractive holographic memories are reflective holograms. The reflective hologram is formed when the object beam and the reference beam are located at the opposite side of the recording plate during the recording process. The opaque medium 430 is used to prevent light from coming from one side of the reading beam and reading the second side in the reading process. The opaque medium 430 may include a photosensitive layer that is coated between the glass substrates and darkened after UV (ultraviolet) light.

Figure 5:
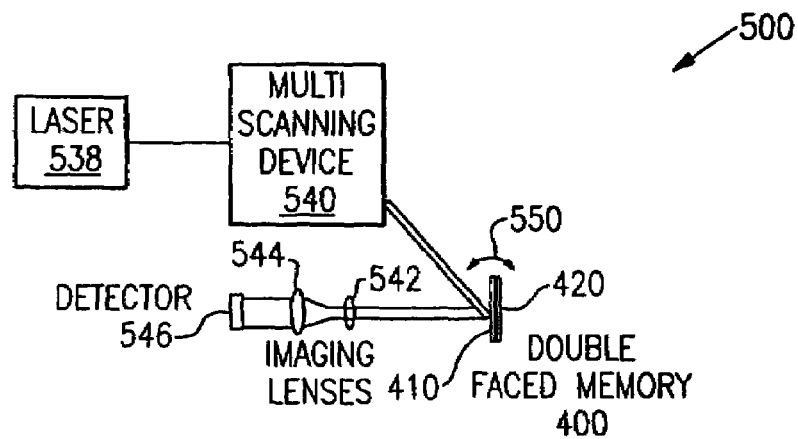
FIG. 5 is a schematic representation of an apparatus for reading information stored on the double-faced diffractive holographic data storage device shown in FIG. 4 in accordance with one embodiment of the invention.

FIG. 5 is a schematic representation of an apparatus for reading information stored on the double-sided diffractive holographic data storage device as shown in FIG. 4 according to one embodiment of the invention. The apparatus 500 includes a laser 538, a multi-scanning device 540, a detector 546, imaging lenses 542 and 544, a rotating table 550, and the double-faced memory unit 400.

The laser 538 generates a beam of light, which is directed by a multi-scanning device 540 to the double-faced memory unit 400. As described in FIG. 4, the double-faced memory unit 400 includes first and second faces 410 and 420. One of the reflective holograms from the double-faced memory unit 400 passes through the pair of lenses 542, 544 before reaching the detector 546. The first side (i.e., face) 410 of the double-faced memory unit 400 is read in the configuration shown. In order to read the opposite side 420 of the double-faced memory unit 400, the rotating table 550 is rotated at an angle (e.g., 180° so that the beam from the multi-scanning device 540 reaches that second face 420. The reading process of information on the second face 420 is similar to the reading process on the first face 410.

Figure 6:
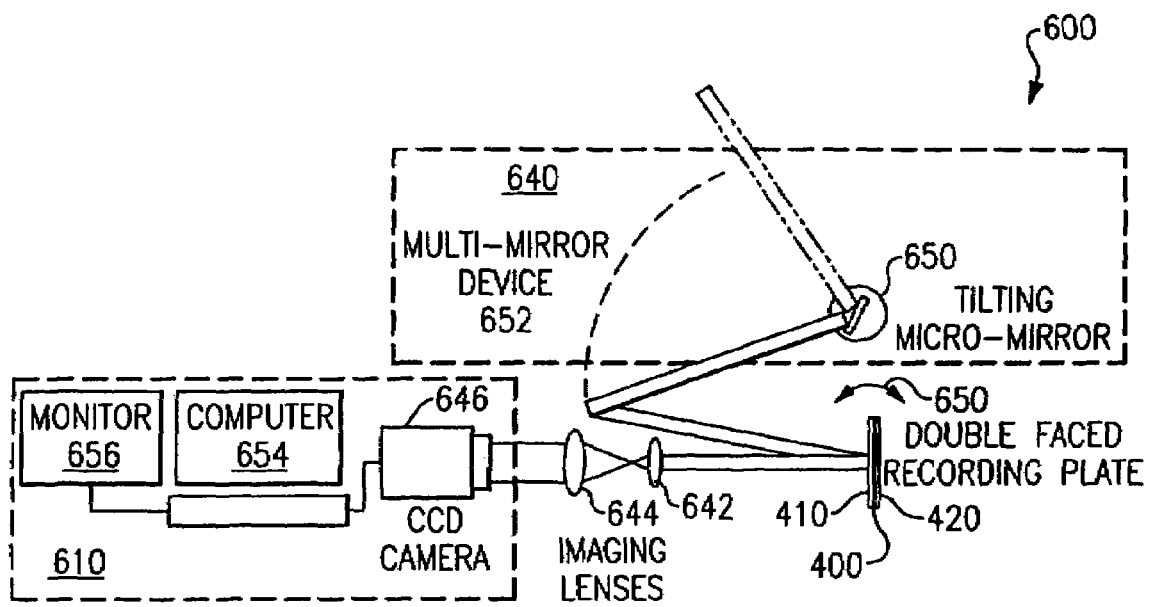
FIG. 6 is a schematic representation of an apparatus for reading information stored on the double-faced diffractive holographic data storage device shown in FIG. 4 in accordance with another embodiment of the invention.

FIG. 6 is a schematic representation of the apparatus for reading the double-faced memory unit 400 according to another embodiment of the present invention. The apparatus 600 includes a detector multi-scanning device 640, the double-faced memory unit 400, a detecting system 610, and a pair of lenses 642 and 644.

The multi-scanning device 640 includes a tilting micromirror 650 and a multimirror device 652. The detecting system 610 comprises a CCD (charge-coupled device), e.g., camera 646 coupled to a computer 654 and a monitor 656. The reading process applied in this embodiment is similar to the reading process described in FIG. 5 in which the reading of one side of the recording plate 400 occurs before the reading of the other side of the recording plate.

Figure 7:
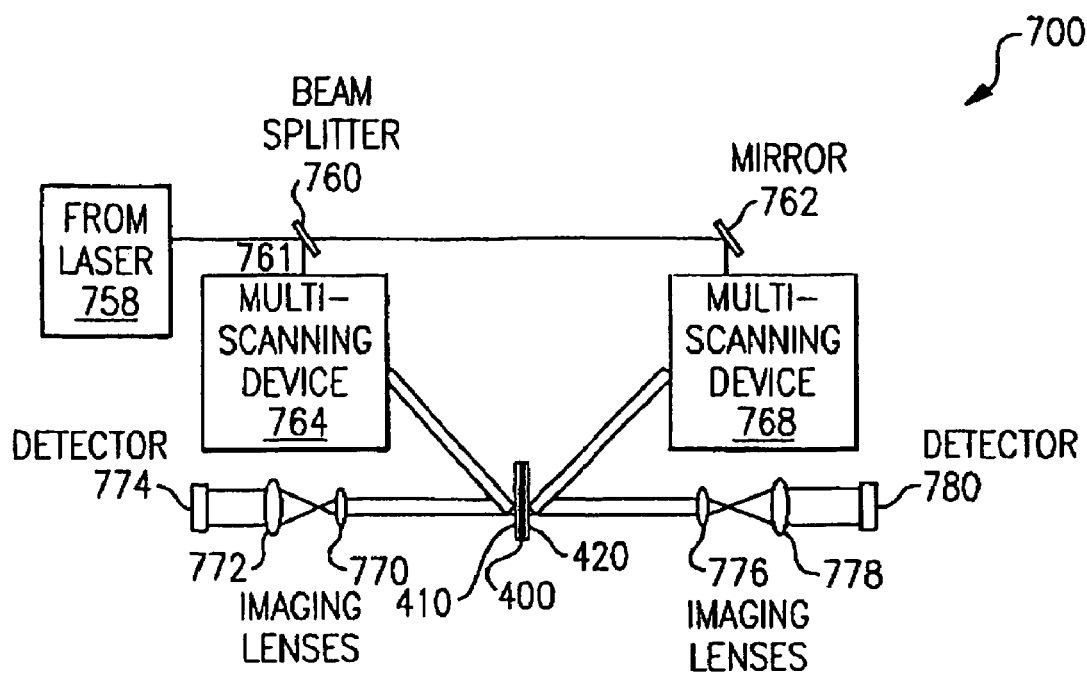
FIG. 7 is a schematic representation of an apparatus for reading information stored on the double-faced diffractive holographic data storage device shown on FIG. 4 in accordance with yet another embodiment of the invention.

Referring now to FIG. 7, another embodiment of an apparatus for reading a double-faced memory unit 400 is shown. The apparatus 700 includes a laser 758, a beam splitter 760, mirrors 761 and 762, two multi-scanning devices 764 and 768, the double-faced memory unit 400, two pairs of imaging lenses 772, 770 and 776 and 778, and two detectors 774 and 780.

This apparatus 700 eliminates the necessity of a rotating table (e.g., rotating table 650 shown in FIG. 6) and thus greatly increases the speed of the reading process since the reading of the double-faced memory unit 400 is simultaneous. In other words, both sides of the double-faced memory 400 can be read in parallel with this implementation.

The beam splitter 760 receives a light beam from the laser 758 and performs a splitting function to the light beam. The mirror 761 and 762 each directs a portion of the beam from the laser 758 to the first and second multi-scanning devices 764 and 768, respectively. The multi-scanning devices 764, 768 each direct a beam to a respective first and second side 410, 420 of the double-faced diffractive holographic data storage device 400. The resulting hologram from the first side 410 passes through imaging lenses 770 and 772 and is detected by detector 774. Additionally, the resulting holograph from the second side 420 is directed to a pair of lenses 776 and 778 and is directed by detector 780.

Figure 8:
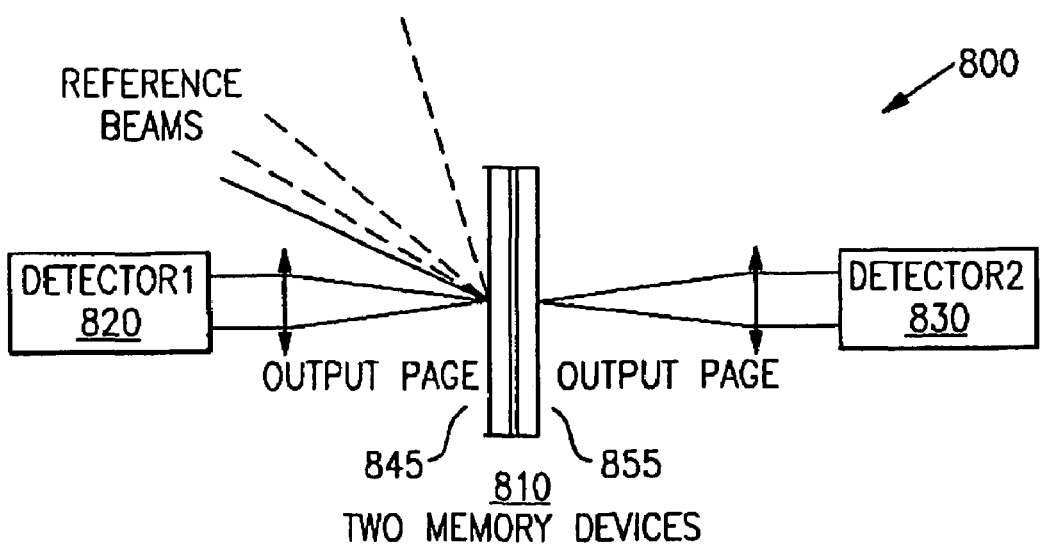
FIG. 8 is a schematic representation of an apparatus for reading information stored on the double-faced diffractive holographic data storage device incorporating both reflective and transmissive holograms in accordance with one embodiment of the invention.

FIG. 8 is a schematic representation of an apparatus for reading information stored on the double-faced diffractive holographic data storage device incorporating both reflective and transmissive holograms in accordance with one embodiment of the present invention. The apparatus 800 includes a double-faced hologram memory device 810, a detector 820, and a detector 830. The memory device 810 includes a memory component 845 and a memory component 855. The two holograms are bonded together in such a manner that in a reading setup simultaneous access of both components 845 and 855 is achieved. When the reference beam emits upon the component 845, a first hologram is generated and a first output is detected by the detector 820. The same reference beam passes through component 845 and reaches component 855 to generate a second hologram and a second output page is detected from the hologram by detector 830. A portion of the reading beam diffracted by the multiplexed volume hologram forms the reconstruction, which is detected by the detectors 820 and 830. The reconstructed beam carries the data that is a replica of the desired page. It is contemplated that there is not an opaque medium between the two components 845 and 855 so that simultaneous reading can be achieved. In order to read information from both sides of the combined memory device 810, component 845 is a reflective hologram and component 855 is a transmissive hologram.

The present invention is not to be limited in scope by the specific embodiments described herein. Indeed, this application is intended to cover any modifications of the present invention, in addition to those described herein, and the present invention is not confined to the details which have been set forth. Thus, the scope of the invention should be determined by the appended claims and their legal equivalents, rather than by the examples given.

What is claimed is:

1. A holographic device comprising:
   a first holographic unit having a first front surface and a first back surface wherein a reflective hologram is formed by interference between object and reference beams on the first front surface; and
   a second holographic unit having a second front surface and a second back surface wherein a transmissive hologram is formed on the second front surface, the second front surface being attached to the first back surface, wherein a reference beam is directed to the first front surface to generate the reflective hologram reflectively diffracted from the first surface, and the transmissive hologram is transmitted through the second holographic unit and emitted out of the second back surface.

2. The apparatus according to claim 1 wherein the reflective hologram is formed by object and reference beams directed to the first front surface and the transmissive hologram is formed by the reference beam directed to the second front surface and the object beam directed to the second back surface.

3. The apparatus according to claim 1 wherein the first or second holographic device is angularly multiplexed.

4. A method for reading a double-sided hologram comprising:
   directing a first read beam incident upon a first side of the hologram at a first predetermined angle;
   directing a second read beam incident upon a second side of the hologram at a second predetermined angle;
   detecting a first output data packet produced by reflective diffraction of the first read beam from the first side;
   detecting a second output data packet produced by the reflective diffraction of the second read beam from the second side; and
   generating the second read beam, the second read beam being a portion of the first read beam.

5. The method according to claim 4 further comprising generating the first read beam from a light source having a same wavelength as a recording wavelength.

6. The method according to claim 4 wherein the double-sided hologram is an angularly multiplexed hologram.

7. The method according to claim 4 wherein the first read beam is a coherent or incoherent light beam.

8. A method comprising:
   providing a first holographic unit having a first front surface and a first back surface wherein a reflective hologram is formed on the first front surface; and
   providing a second holographic unit having a second front surface and a second back surface wherein a transmissive hologram is formed on the second front surface; and
   attaching the second front surface to the first back surface of the first holographic unit; wherein a reference beam is directed to the first front surface to generate the reflective hologram reflected from the first surface, and the second hologram is transmitted through the second holographic unit and emitted out of the second back surface.

9. The method according to claim 8 wherein the reflective hologram is formed by object and reference beams directed to the first front surface and the transmissive hologram is formed by the reference beam directed to the second front surface and the object beam directed to the second back surface.

10. The method according to claim 8 wherein the first and second holographic units each comprise at least two layers, the first layer comprising a thin film of holographic recording material and the second layer comprising a substrate.

11. The method according to claim 10 wherein the holographic recording material is an organic material.

12. The method according to claim 11 wherein the organic material is a polypeptide.

* * * * *